INVENTORS P. E. SCARBOROUGH, JR.
D. S. WATSON
BY William Ryan
ATTORNEY

United States Patent

Scarborough, Jr. et al.

[15] 3,651,508

[45] Mar. 21, 1972

[54] SYSTEM FOR EVALUATING LIGHT PEN STRIKES

[72] Inventors: Paul Edward Scarborough, Jr., Burlington; David Stuckey Watson, Winston Salem, both of N.C.

[73] Assignee: Bell Telephone Laboratories, Incorporated, Murray Hill, N.J.

[22] Filed: Nov. 23, 1970

[21] Appl. No.: 91,842

[52] U.S. Cl. ......................340/324 A, 250/217 CR, 315/18, 340/172.5

[51] Int. Cl. ..........................................................G06f 3/14

[58] Field of Search ................340/324 A, 172.5; 235/150.4, 235/151, 152; 315/18; 250/217 CR

[56] References Cited

UNITED STATES PATENTS

| | | | |
|---|---|---|---|
| 3,089.918 | 5/1963 | Graham | 340/324 A X |
| 3,346,853 | 10/1967 | Koster et al. | 340/172.5 |
| 3,394,366 | 7/1968 | Dye | 340/324 A |
| 3,440,638 | 4/1969 | Valkenburg | 340/324 A |
| 3,441,722 | 4/1969 | Gloess | 235/151 |
| 3,505,666 | 4/1970 | Thorpe | 340/324 A |
| 3,512,037 | 5/1970 | Eckert et al. | 340/324 A X |
| 3,534,338 | 10/1970 | Christensen et al. | 340/172.5 |
| 3,543,240 | 11/1970 | Miller et al. | 340/172.5 |
| 3,551,896 | 12/1970 | Baskin et al. | 340/172.5 |
| 3,506,875 | 4/1970 | Watanabe et al. | 340/324 A X |

*Primary Examiner*—David L. Trafton
*Attorney*—R. J. Guenther and William L. Keefauver

[57] ABSTRACT

Data processing apparatus and methods for identifying a point on a continuous displayed image are described. In the case of a continuous vector, an iterative sequence of pairs of decreasingly smaller vectors are generated and evaluated to detect the location of a light pen strike on the continuous vector. In particular, when a vector in the iterative sequence is detected which is found to have sufficiently small magnitude, the process is terminated and one end of that vector is considered to be the desired point.

9 Claims, 8 Drawing Figures

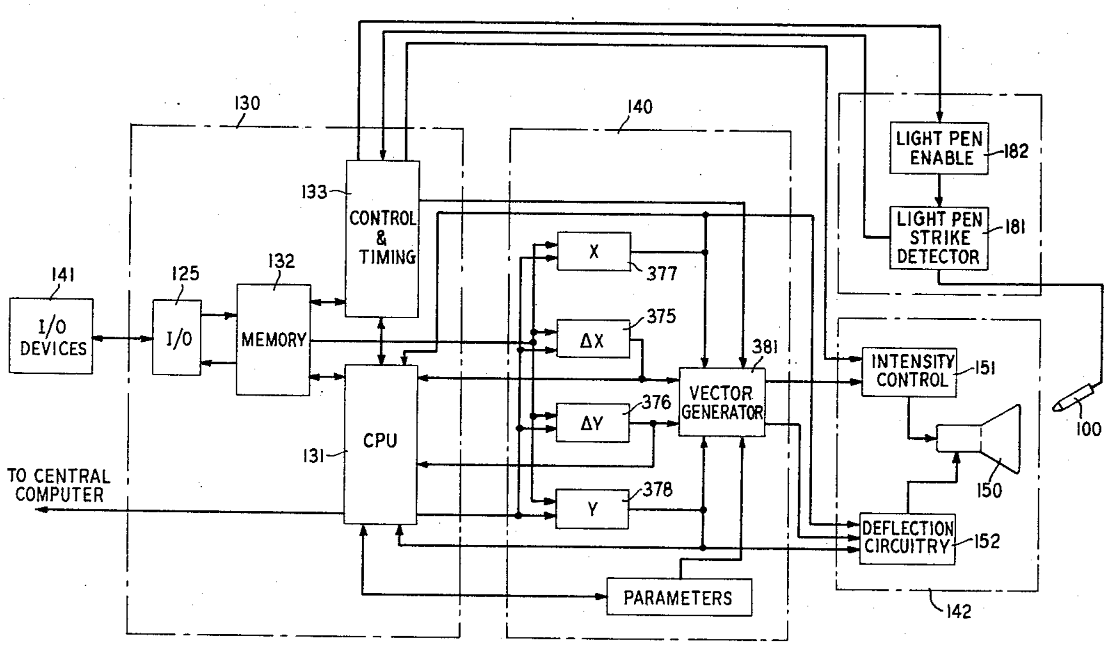

SYSTEM FOR EVALUATING LIGHT PEN STRIKES

This invention relates to graphical data processing systems. More particularly, this invention relates to an improvement to graphical data processing systems incorporating a vector or stroke generator. Still more particularly, the present invention relates to a system for identifying points on a display device in a graphical data processing and display system incorporating a vector generator.

BACKGROUND OF THE INVENTION

There has been a rapid growth in the field of data processing systems generally in recent years. A particularly active area of development within the field of data processing systems has been that relating to subsystems or peripheral systems devoted to the generation of graphical images on cathode ray tubes (CRT's) or similar devices. Typical of these systems is that described in U.S. Pat. application by C. Christensen et al., Ser. No. 682,249, filed Nov. 13, 1967, now U.S. Pat. No. 3,534,338. Other systems in this general field have been described, for example, in U.S. Pat. No. 3,256,516 issued to J. J. Melia et al. on June 14, 1966; No. 3,337,860 issued to A. C. O'Hara, Jr., on Aug. 22, 1967; and No. 3,389,404 issued to R. A. Koster on June 18, 1968.

An important feature of many well-known graphical data processing systems is an ability to indicate to the system portions of a displayed image under operator control. A particularly useful device for performing this function is the so-called light pen described, for example, in U.S. Pat. No. 2,915,643 issued to R. G. Mork on Dec. 1, 1959. Systems featuring such a device and including special apparatus responsive to signals generated by such a light pen are described, for example, in U.S. Pat. No. 3,509,350 issued to R. J. Gundrum on Apr. 28, 1970; No. 3,512,037 issued to E. R. Eckert et al. on May 12, 1970; and No. 3,506,875 issued to Shigeru Watanabe et al. on Apr. 14, 1970.

Various of the above-described systems also include special apparatus for facilitating the generation of visual representations of line segments. That is, while many of the above systems employ a sequence of closely spaced points to generate an approximation to a line segment, others provide an apparatus element which generates signals of such a nature as to cause the electron beam in a cathode ray tube to follow a prescribed continuous path. The advantages of such continuous path systems are clear. Most importantly, perhaps, such line drawing, or vector, systems require only the specification of end points of a desired straight line segment. In point-plotting systems, not including a vector generator, storage is typically required for each point in the sequence which is to approximate a desired straight line.

Other vector drawing systems are described in U.S. Pat. No. 3,482,309 issued to R. J. Bouchard on Dec. 9, 1969; and No. 3,252,045 issued to D. J. Griffen on May 17, 1966.

Although the so-called vector computer graphics systems provide faster (generally) line drawing facilities with decreased storage requirements while requiring only a modest increase in the amount of apparatus required, they nevertheless suffer from a number of defects. U.S. Pat. application by J. R. Holland, Ser. No. 54,400, filed July 13, 1970, assigned to the same assignee as the present invention, is directed to the solution of one of the shortcomings of such a vector system. The Holland application is, in part, directed to apparatus and methods detecting a violation of a prescribed boundary on the CRT or other graphical output device in the system.

Another shortcoming of such vector computer graphics systems becomes evident when an attempt is made to incorporate the teachings of the several light-pen-based systems described in the references cited above into a system including a vector generator. In particular, because each of the points on a vector is not individually stored and specified by a number or other equivalent indication, it is not always possible to point to a particular point along a vector appearing on the face of a CRT or similar output device. Thus identification of points along a line segment generated by a vector generator is more difficult than in point-plotting systems.

It is accordingly an object of the present invention to overcome the limitations of a vector display system when used in conjunction with a light pen.

It is a further object of the present invention to provide means for uniquely identifying, within a prescribed margin or error, a point on a vector displayed on a display device.

SUMMARY OF THE INVENTION

These and other objects of the present invention are realized in a preferred embodiment of the present invention, including a programmed digital computer arranged to process stored information and to drive a display device, such as a CRT. The programmed machine is arranged to receive and interpret signals generated by a light pen, which light pen is, in turn, responsive to an image appearing on the face of the CRT.

Upon receiving an indication from the light pen (a light pen strike), the data processor executes a light pen strike identification subroutine. This subroutine directs that a sequence of vectors of decreasing size be generated along the same path as the vector giving rise to the original light pen indication. These smaller vectors are conveniently drawn in non-overlapping pairs. After each pair of vectors is drawn, the continued presence of the light pen at its original position is used to detect which of the pair of vectors coincides with the original vector at the point identified by the position of the light pen. As the pairs of vectors are generated in sequence, the location of the light pen becomes more and more localized. A final pair of vectors is used to locate, within a prescribed margin of accuracy, the exact location of the light pen.

It is therefore a feature of the present invention that programmed data processing means for controlling a vector generator in response to light pen strikes be provided in a vector computer graphics system.

It is another feature of the present invention that means for generating decreasingly smaller pairs of vectors, which vectors are colinear with an original vector, but which have individual lengths not exceeding one-half of each vector of a previously generated vector pair, be provided in a computer graphics system.

BRIEF DESCRIPTION OF THE DRAWING

These and other objects and features of the present invention will become more apparent after consideration of the following detailed description of the present invention, taken with the attached drawing wherein.

DETAILED DESCRIPTION

Figure 1:
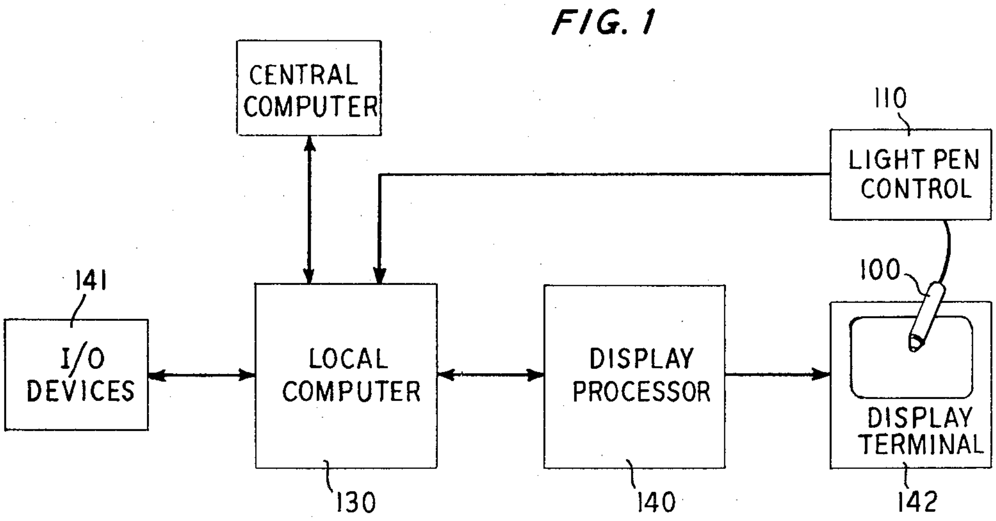
FIG. 1 shows the general arrangement of a digital computer graphics system including the present invention.

The present invention is useful in any number of computer-based visual display systems. Typical of these systems is one disclosed in U.S. Pat. No. 3,534,338 issued to C. Christensen et al. on Oct. 13, 1970, and assigned to the assignee of the present invention. This patent by Christensen et al. is hereby incorporated by reference in the present application and all of the descriptions and the drawing set forth there should be considered to be included in this application as if explicitly set forth herein.

The Christensen et al. patent describes a system having a large central computer interacting with a number of display terminals, each potentially comprising a local data processor. While the present application describes an invention useful in this overall context, nevertheless the most important features of the present invention relate to operations performed only at the local terminal.

The light pen strike determination apparatus and methods of the present invention are realized and practiced in one preferred embodiment of the present invention using apparatus shown generally in FIG. 1.

In particular, FIG. 1 shows a computer 130 cooperating with a display processor 140 in the manner described in the above-cited Christensen et al. patent to generate signals appropriate for producing a visible image on a CRT or other display device labeled 142 in FIG. 1. Also shown in FIG. 1 is a light pen 100 and associated light pen control circuit 110 for supplying a signal to computer 130 in response to an image appearing on the face of display device 142. Light pen control circuit 110 is operated under the control of computer 130, as described below. Input/output devices shown as 141 in FIG. 1 are used to enter programs and data into computer 130 and to generate outputs as well.

Figure 2:
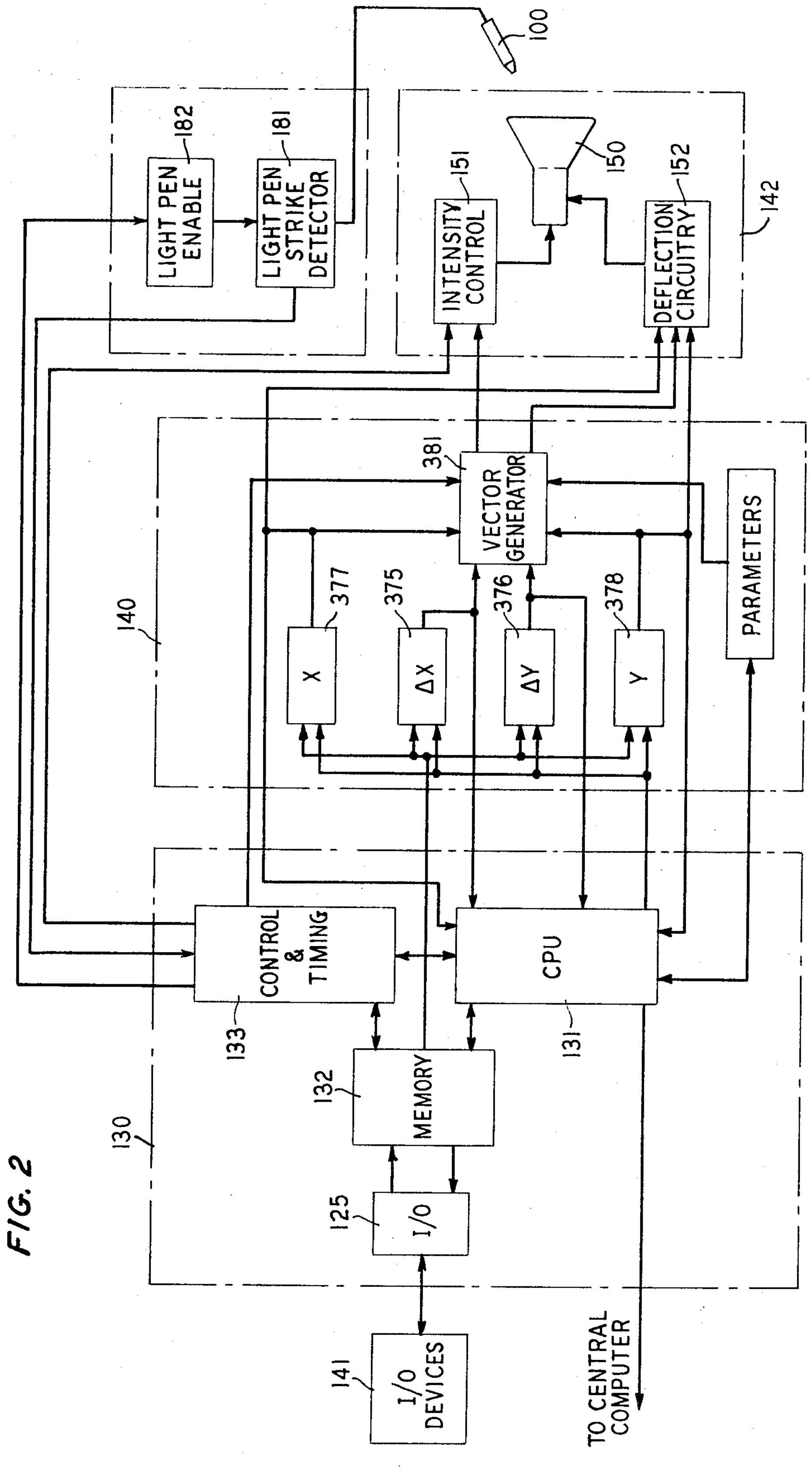
FIG. 2 shows in greater detail selected elements shown in FIG. 1.

FIG. 2 shows certain of the units of FIG. 1 in greater detail. While not all of the elements in each of the units of FIG. 1 are included, there are included in FIG. 2 those portions of the Christensen et al. system, along with various additions and modifications thereto, necessary or useful in carrying out the present invention. It is noted that the central computer unit shown in FIG. 1 has been omitted from FIG. 2 for purposes of simplification.

Computer 130 typically comprises a Digital Equipment Corporation model PDP–9 general purpose programmable digital computer. Computer 130 is shown to include a controller 133 for supplying, under stored program or hardwired program control, the necessary timing and control functions required to carry out the various individual functional steps in accordance with the preferred embodiment of the present invention. Typically, computer 130 is arranged to store in memory 132 a program sufficient to direct the generation of control signals of the type mentioned above. Memory 132 is arranged to receive (by way of input/output unit 125) from one or more local input devices, included in the unit represented as 141 in FIG. 2, data signals for altering the program and/or display data stored in memory 132.

Local input devices typically include paper tape readers, magnetic tape readers, keyboards, and similar devices typical of computer systems like those presently being considered. Of course, light pen 100 represents such an input device. However, because of its unique function, performed in connection with the present invention, it has been singled out for separate representation and discussion.

Similarly, output devices typically included in functional units represented by 141 in FIG. 1 are page printers, card punch machines, microfilm and other X –Y plotters and the like. Display device 142 is separately indicated because of the central role this output device plays in the preferred embodiment of the present invention.

Display device 142 typically comprises a Control Data Corporation Model 250 display system. Such a system typically includes a cathode ray tube (CRT) 150 of standard design and associated well-known deflection and intensity control circuit 151 and 152, respectively. Deflection signals generated by deflection circuitry 152 are used to cause the electron beam of CRT 150 to move in a desired manner over its display surface.

Also shown in FIG. 2 as being included in computer 130 is central processor (CPU) 131. CPU 131 also operates under program control to perform arithmetic and logical operations required in practicing the present invention.

Display processor 140 shown in FIG. 2 includes a number of registers for temporarily storing graphical data signals. In particular, X and Y registers 377 and 378 store signals for controlling respective X and Y deflection circuitry in deflection circuit 142.

Also shown in FIG. 2 as included in display processor 140 are $\Delta X$ and $\Delta Y$ registers for storing signals which represent desired increments corresponding, for example, to the relative spacing of end points of a vector to be drawn on the surface of display device 142. Signals from $\Delta X$ and $\Delta Y$ registers 375 and 376 respectively are supplied to vector generator 381, as are signals from registers 377 and 378. Vector generator 381 is of standard design and includes circuitry for generating X and Y control signals appropriate for controlling deflection circuitry 152, thereby causing the electron beam in CRT 150 to follow a continuous straight line across its display surface. Typical vector generators useful in fulfilling the function of unit 381 in FIG. 2 are described, for example, in U.S. Pat. No. 3,488,483 issued to N. Freedman on Jan. 6, 1970; and No. 3,482,309 issued to R. J. Bouchard on Dec. 9, 1969.

Figure 3:
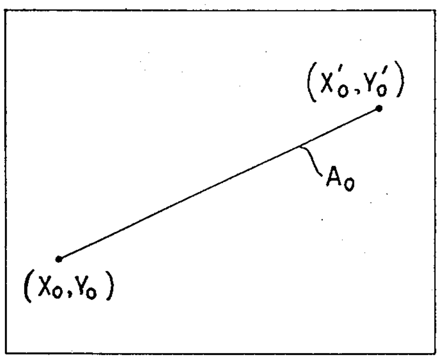
FIG. 3 shows a typical vector drawn on the display device included in the system of FIGS. 1 and 2.
Figure 4A:
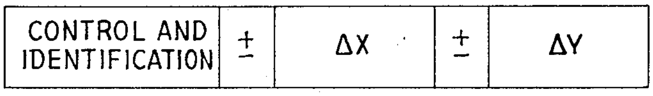
FIGS. 4A, B, and C show typical instruction words to be stored in the system of FIGS. 1 and 2 for controlling the generation of display images.

When it is desired to generate a vector such as that shown in FIG. 3 by the line designated $A_o$ having coordinates $(X_o, Y_o)$ and $(X'_o, Y'_o)$, the coordinates of the initial point, say $X_o$ and $Y_o$, are loaded into registers 377 and 378, respectively. These numbers may be supplied separately (by CPU 131, memory 132, or otherwise) or they may be left over from prior computations and/or deflections. Thus a desired vector may be specified, for example, by reading from memory a vector word such as shown in FIG. 4A. In the parlance of the Christensen et al. patent, supra, the instruction of FIG. 4A corresponds to a short relative vector. That is, as interpreted by control circuit 133 and CPU 131, a single relative vector instruction such as is shown in FIG. 4A will cause vector generator 381 to draw the indicated vector beginning at $(X_o, Y_o)$ and extending to $(X'_o, Y'_o)$. Upon completion of the vector drawing operation, the contents of X and Y registers 377 and 378 are up-dated by adding to their contents the corresponding contents of $\Delta X$ and $\Delta Y$ registers 375 and 376, respectively. Thus, upon completion of an indicated drawing operation the contents of X and Y registers 377 and 378 represent the end point $(X'_o, Y'_o)$ of the indicated vector. The reading of another instruction of the type shown in FIG. 4A will cause another vector to be drawn having the indicated $\Delta X$ and $\Delta Y$ components beginning at the point indicated by the contents of X and Y registers 377 and 378, respectively.

Figure 4B:

If, in the course of generating a sequence of vectors, it is desired to disconnect or otherwise separate one or more vectors from other display elements, it is possible to merely modify the contents of X and/or Y registers 377 and 378, respectively. An instruction word useful in performing this repositioning operation is shown in FIG. 4B. As shown in FIG. 4B the instruction word contains at the leftmost portion an indication of the type of instruction and any other desired control information. Another portion of the instruction indicates either the particular coordinate is an X component or a Y component. This may be indicated, for example, by assigning a O with an X coordinate, for example, and a 1 with a Y coordinate. The remaining portion of the instruction of FIG. 4B typically provides for the specification of a value for the indicated (X or Y) coordinate.

In a typical display system it is possible to control the display of information over a grid including, for example, $2^{10}=1,024$ points. In such a system it is usually necessary to specify, in the coordinate portion of instructions of the type shown in FIG. 4B, a binary number containing 10 binary digits. If a particular computer being used in the system of FIG. 2 has a word length of sufficient magnitude, it may be possible to include both the "X" and "Y" coordinates in the same instruction word. For present purposes, however, it will be assumed that an absolute coordinate realignment (with both X and Y coordinates changed) will be performed by executing successive X and Y absolute coordinate instructions.

Intensity control circuit 151 in FIG. 2 operates under the control of control and timing circuit 133 to energize the electron beam in CRT 150 when desired. Because there may be instances when it is desired to draw an invisible vector on the face of CRT 150, it is useful to provide in the control and identification portion of an instruction, such as that shown in FIG. 4A, one or more bits for directing control and timing circuit 133 to interrupt or deenergize intensity control circuit 151. This may be accomplished, for example, by the simple expedient of having a bit in the control and identification portion of a vector instruction, such as that shown in FIG. 4A, ANDED with the output of a source of energy for operating the electron beam in CRT 150.

As is well-known, light pens or similar devices may be positioned on the surface of a display device such as CRT 150 in FIG. 2 for purposes of detecting the incidence of an electron beam on a particular portion of the display surface. Thus, for example, if a light pen were positioned on a point along the line segment extending between ($X_O$, $Y_O$) and ($X'_O$, $Y'_O$) in FIG. 3, it would be possible to detect the passage of the electron beam past that point. In general, light pens are operative in response to light emanating from a small area on the face of a CRT. While the range of such light pens differs from one model to another, it may be assumed that in typical operating circumstances, a light pen is operative over a circular area having a diameter equal to 5 coordinate points. In general, then, it is possible to locate a separately specified point on the face of a CRT to within approximately 5 raster points in a typical operation. Many systems have been proposed for improving the identification of light pen strikes. Such systems are described, for example, in U.S. Pat. No. 3,509,350 issued to R.J. Gundrum on Apr. 28, 1970; No. 3,512,037 issued to E.R. Eckert et al. on May 12, 1970; and No. 3,506,875 issued to Shigaro Watanabe et al. on Apr. 14, 1970.

However, none of the cited references provides for identifying precisely a point along a vector such as $A_O$ in FIG. 3. This is true because in general light pen identification techniques rely upon fixed information stored in registers such as 377 and 378 in FIG. 2. Thus with respect to a vector drawn in the manner of $A_O$ in FIG. 3 there is an inherent ambiguity with respect to the exact point at which a light pen may be used. Because the prior art systems rely on the contents of X and Y registers, and these registers are usually not up-dated until the end of a vector writing operation, no more accurate indication is available. That is, only the beginning point and end point of a vector are available for identifying the location of a light pen strike somewhere along a vector connecting these two points.

The present invention overcomes these limitations by providing for the generation under program control of a sequence of decreasingly smaller vectors. These smaller vectors are typically colinear with an original vector which gave rise to a light pen strike. By successively evaluating the light pen strike corresponding to each of the decreasingly smaller vectors, the light pen strike is increasingly localized. When a vector causing a light pen strike is generated which has a magnitude which is within a prescribed range, the sequence of vectors is terminated and the final end point is returned to the system as the point at which the light pen strike occurred.

Figure 5:
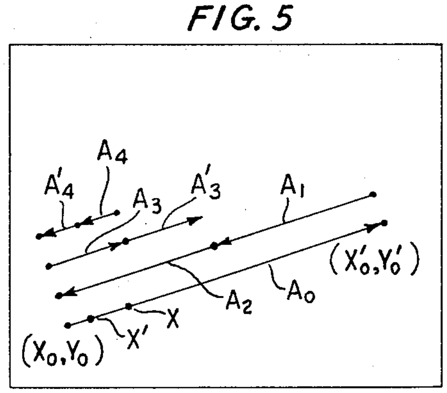
FIG. 5 illustrates a number of vectors generated by apparatus made and/or operated in accordance with one embodiment of the present invention.

This process is illustrated in FIG. 5 where a number of colinear vectors is represented by a sequence of parallel vectors. That is, although the vectors in this the sequence of vectors are in fact colinear, they are shown in parallel disposition merely for purposes of clarifying the present description. It is noted that such a spacing may be desirable in some cases, but is in no way necessary to the operation of the present invention. For purposes of illustration, then, the sequence of operations associated with a light pen strike occurring at a point marked X on vector $A_O$ will be traced. It will again be assumed that $A_O$ has endpoint coordinates ($X_O$, $Y_O$) and ($X'_O$, $Y'_O$). In all cases the direction of arrows will indicate the direction in which a particular vector has been drawn.

Referring to FIGS. 2 and 5, following the generation of vector $A_O$, computer 130 will have been notified that a light pen strike has occurred during a scan of vector $A_O$. Notice of the occurrence of a light pen strike will have been transmitted to computer 130 by way of light pen 100 and light pen strike detector 181. Light pen strike detector 181 will in turn have been operated under the control of control and timing circuit 133 and light pen enable circuit 182. That is, when computer 130 has decided (because of program developments, or in response to an external input) that a light pen strike identifying a particular point on a display image is required, a control signal will issue from control circuit 133 to cause light pen enable circuit 182 to enable light pen strike detector 181.

When the signal corresponding to a light pen strike along vector $A_O$ is sent from light pen strike detector 181 back to control and timing circuit 133 in computer 130, control and timing circuit 133, operating under program control, causes CPU 131 to perform a sequence of operations. These operations cause a sequence of data items to be loaded in registers 375 through 378 and cause a sequence of vectors to be generated by vector generator 381 in response to the signals stored in these registers. During the generation of these vectors light pen 100 will be assumed to remain in substantially the same position as it was in during the drawing of $A_O$ which caused the initial light pen strike.

In particular, upon the conclusion of the generation of vector $A_O$ (whether or not a light pen strike was detected), register 377 will have stored in it a binary number representing coordinate $X'_O$. Similarly, register 378 will have stored in it a binary number representing coordinate $Y'_O$. The light pen strike detector then causes control and timing circuit 133 to signal CPU 131 to modify the contents of registers 375 and 376. In particular, these registers will be modified in such manner as to cause vector $A_1$ to be generated during a subsequent generation period.

This is conveniently effected by the simple expedient of changing the sign of the contents of registers 375 and 376 and simultaneously halving those signals representing the magnitude of the X and Y increments corresponding to vector $A_0$. Thus if $A_0$ had increments $\Delta X = 20$ and $\Delta Y = 30$, then the increments associated with vector $A_1$ are $\Delta X = -10$ and $\Delta Y = -15$. This halving is conveniently effected in some embodiments of the present invention by simply shifting the contents of $\Delta X$ register 375 and $\Delta Y$ register 376 by one position in a rightward direction.

Upon the completion of the generation of vector $A_1$ it will be apparent that no additional light pen strike will have occurred. It should be noted in this connection that light pen strike detector 181 is conveniently retained in its enable stage during the entire process of successively scanning for a light pen strike in the manner shown in FIG. 5. This fact is duly recorded in timing and control circuit 133 by means of a flip flop or other temporary storage device. Alternately, light pen detector 181 is enabled immediately prior to each vector generation.

No light pen strike having occurred during the drawing of vector $A_1$, another vector $A_2$ extending from the end of $A_1$ and continuing to the original beginning point of vector $A_0$ is drawn. Thus in the example given above, $A_2$ has components $\Delta X = -10$, $\Delta Y = -15$. At the end of the drawing of vector $A_2$, contents of registers 377 and 378 represent coordinates $X_0$ and $Y_0$, respectively. Also because the pen remains positioned at the point "X" along the original vector $A_0$, it will also be at a position along the line segment identified as $A_2$ in FIG. 5.

Again the contents of registers 375 and 376 are altered by reversing the respective sign bits and by halving the contents of the magnitude portions of these registers. Vector $A_3$ is then drawn. At the end of the drawing of vector $A_3$, the contents of registers 377 and 378 will be up-dated to correspond to the end point of vector $A_3$. Also, a light pen strike will have been returned during the generation of $A_3$. Again this fact is noted in control and timing circuit 133. It may be desirable for purposes of continuity to continue with the drawing of a vector such as $A_3'$ in FIG. 5. However, the drawing of this vector is not strictly necessary. Thus upon the generation of vector $A_3$ the contents of registers 375 and 376 will again be halved and the sign bits reversed. Then vector $A_4$ is drawn. At the conclusion of the drawing of vector $A_4$, registers 377 and 378 store the end point of vector $A_4$.

Upon the generation of each new vector a test is conveniently performed to determine the length of that vector. In some embodiments such a test is performed only after a light pen strike. From elementary geometrical considerations it is clear how CPU 131 performs the operations for determining L, where, $L^2 = (\Delta X)^2 + (\Delta Y)^2$. This length L is conveniently compared with a reference length stored in control and timing circuit 133. This reference length may, for example, represent a magnitude of, say, 10 raster (coordinate) units. Whenever it has been found that a current vector is less than or equal to this reference magnitude, the vector generation process illustrated in FIG. 5 is terminated. Thus for the vectors shown in FIG. 5 a determination that vector $A_4$ is less than or equal to the reference length will cause the vector generation process to be terminated. The result of the light pen strike identification sequence will then be that the coordinates of the end point stored in registers 377 and 378 at the termination of the drawing of vector $A_4$ represent the true location of the original light pen strike.

If, on the other hand, the original light pen strike had occurred at a point such as X' in FIG. 5, then the drawing of an additional vector ($A_4'$), colinear with and equal in length to its counterpart vector $A_4$, and terminating at ($X_0$, $Y_0$) would have been required. In this case (assuming the value for L dictated that no more vectors were to be drawn) the result returned to computer 130 would have been the end point ($X_0$, $Y_0$).

WORD STATEMENT OF THE ALGORITHM

While the above procedure was described in a typical narrative fashion, it is considered helpful, in facilitating the actual coding of a program for practicing the present invention, to explicitly enumerate the steps involved in a particular embodiment of the present invention. Accordingly, the above procedure will be restated in the form of a number of individual component steps.

Figure 4C:
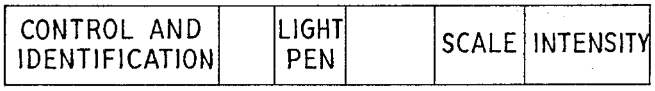

For this purpose certain notation proves to be useful. Thus $\Delta X_0$ and $\Delta Y_0$ are used to denote the X and Y components respectively of the original vector. The notation S denotes a scale factor which, in accordance with the teachings of the Christensen et al. patent, supra, is used to multiply or "scale" individual data entries prior to executing the instruction dependent upon them. Thus, for example, there is included in the instruction repertoire of a computer system, in accordance with the Christensen et al. patent, an instruction known as a parameter instruction. A representation of a parameter instruction is included in FIG. 4C. FIG. 4C corresponds in part to FIG. 5B of the Christensen et al. patent. One interpretation of the effect of a scale factor is that it causes a right or left shift of data before, during, or after its transfer to registers such as 375–378. Advantageously, the presence of a scale factor other than 1 will cause data from memory 132 to pass to registers 375–378 by way of CPU 131. Thus any shifting prescribed by a current (non-unity) scale factor may be accomplished in CPU 131.

Finally, the notation [Z] denotes the greatest integer less than or equal to Z if Z is positive, and denotes the least integer greater than or equal to Z if Z is negative. The reference length against which successive vectors is to be compared is taken to be 5 raster units. A vector is assumed to be specified by its components, i.e., ($\Delta X$, $\Delta Y$) specifies a vector. The beginning point of a vector is assumed to be stored in registers 377 and 378 before the vector is drawn and the end point of the vector stored there after the vector is drawn.

With this preamble, a statement of an algorithm in accordance with a preferred embodiment of the present invention is as follows:

i. Prepare two vectors ($\Delta X_1$, $\Delta Y_1$) and ($\Delta X_2$, $\Delta Y_2$) such that $\Delta X_1 = [-\Delta X_0/2]$
$\Delta Y_1 = [-\Delta Y_0/2]$
$\Delta X_2 = \Delta X_1$ if $\Delta X_0$ is an even integer
$= \Delta X_1 + 1$ if $\Delta X_0$ is odd and negative
$= \Delta X_1 - 1$ if $\Delta X_0$ is odd and positive
$\Delta Y_2 = \Delta Y_1$ if $\Delta Y_0$ is an even integer
$= \Delta Y_1 + 1$ if $\Delta Y_0$ is odd and negative
$= \Delta Y_1 - 1$ if $\Delta Y_0$ is odd and positive where ($\Delta X_0$, $\Delta Y_0$) is the original vector giving rise to a light pen strike whose position is to be evaluated.

ii. Draw the sequence of vectors ($\Delta X_1$, $\Delta Y_1$), ($\Delta X_2$, $\Delta Y_2$) until a light pen strike is detected.

iii. If no light pen strike occurs during (ii), then set $\Delta X_1 = -\Delta X_1$, $\Delta Y_1 = -\Delta Y_1$, $\Delta X_2 = -\Delta X_2$, $\Delta Y_2 = -\Delta Y_2$ and repeat (ii) until a light pen strike occurs or at most for same predetermined number, N, times. If no light pen strike is detected after N tries, return to the main program and redraw the original vector.

iv. If a light pen strike is detected during (ii), check the length of the struck vector $(x,y)$, where $(x,y) = (\Delta X_1, \Delta Y_1)$ or $(\Delta X_2, \Delta Y_2)$. If the length of $(x,y)$ is 5 raster units or less, then return the contents of X and Y registers 377 and 378 as the point struck. If the length is greater than 5 raster units, then set $\Delta X_0 = x$, $\Delta Y_0 = y$ and repeat the process by returning to (i).

DESCRIPTION OF FLOW CHARTS

Figure 6:
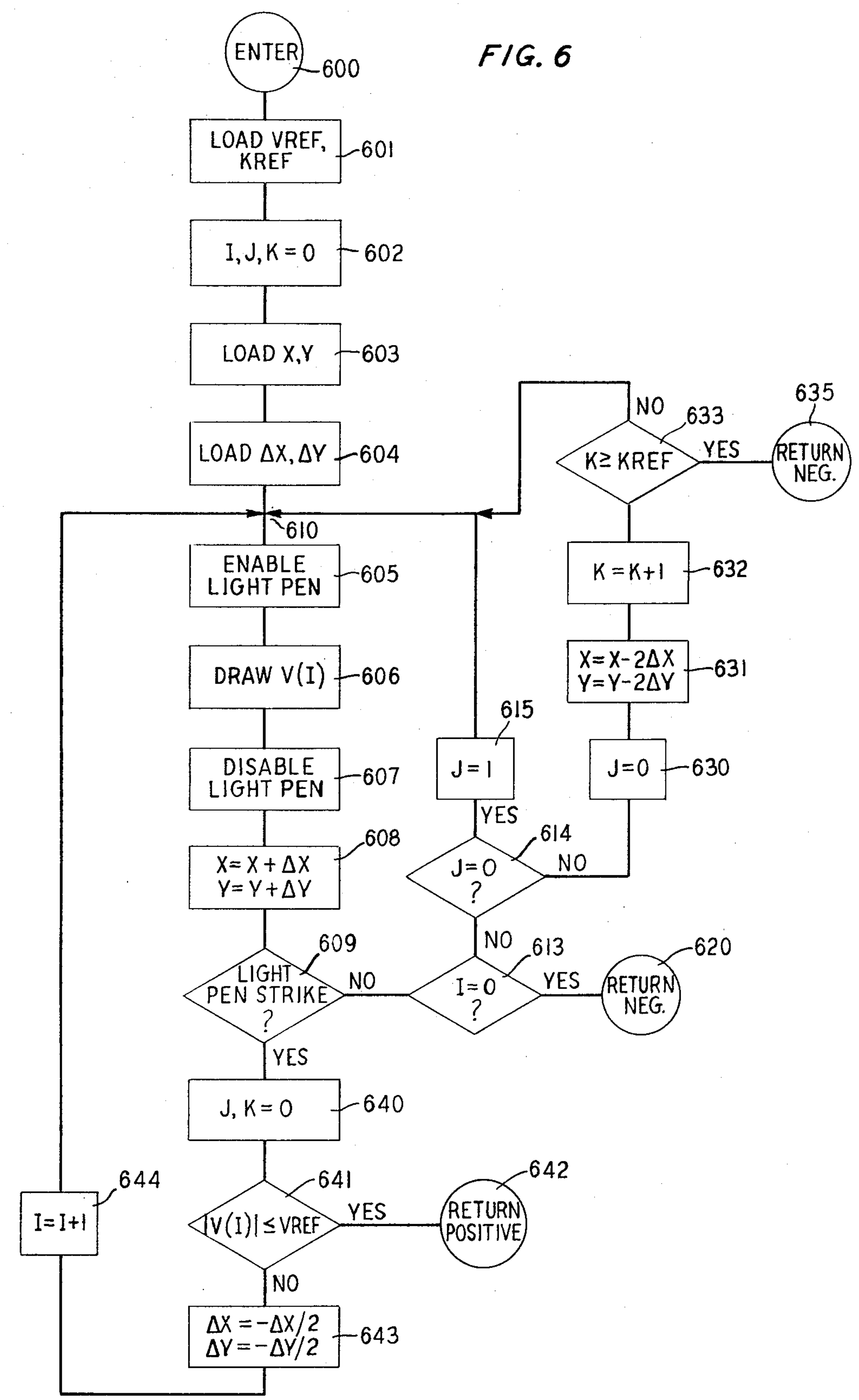
FIG. 6 is a flow chart illustrating programs and control sequences which are useful in practicing the present invention.

FIG. 6 shows a flow chart in accordance with an alternate embodiment of the present invention. It should be understood that in this and other versions of the present invention, a flow chart or a corresponding algorithmic statement is intended to be coded in the form of a sequence of individual computer instructions. Depending upon the particular machine to be used, these instructions will assume a variety of detailed forms. There remains no uncertainty, however, regarding the transformation from the various statements and/or flow charts to the required coding.

FIG. 6 shows a first functional entity entitled "ENTER" 600. This represents the point in the execution of a program by local computer 130 in FIGS. 1 and 2 at which a vector is to be drawn. Next, information representing the desired magnitude of a reference vector is loaded as indicated by block 601. This reference vector VREF indicates the tolerable error that may be introduced upon the identification of a particular light pen strike. It is possible, of course, to load a reference vector magnitude having the value zero. This indicates that the exact point at which a light pen strike has occurred is to be identified.

Block 602 in FIG. 6 initializes an indexing variable I. I is the index variable associated with the iterative generation of vector pairs as described above. The value zero for I corresponds to the degenerate case where no pair of vectors are generated, i.e., only the original vector, $A_0$, is generated. Index variable J assumes either of two values, 0 or 1; when J = 1 the vector being generated is the second of a pair. The index K indicates how many tries have been made at a particular iteration to detect a light pen strike without success.

Block 603 provides for loading the X and Y coordinates of the beginning point of the desired vector into registers 377 and 378. It should be understood of course that these values may already be stored in the appropriate registers because of a prior computation. Block 604 indicates that the load $\Delta X$ and load $\Delta Y$ operations are effected next. These quantities are of course loaded into registers 375 and 376 respectively. Block 605 indicates the so-called enable light pen operation. Thus, if it is desired that a light pen strike be subject to identification by the system of FIG. 2, a light pen enable signal is specified. This may be accomplished, for example, by detecting the presence of a prescribed condition for a byte in a parameter word. For this purpose, the parameter word in FIG. 4C is shown to include a light pen byte. This byte may include only a single binary digit which may be arranged to have a value of 1 when it is desired that the light pen be enabled, and a zero value otherwise.

The block labeled 606 directs that the vector generator 381 in FIG. 2 actually draw the vector prescribed by the contents of registers 375–378. After completion of the indicated vector, the contents of registers 377 and 378 are up-dated as indicated by block 608 in FIG. 6 to reflect the fact that the current position of the electron beam is at the end of a vector drawn, i.e., ($X_0'$, $Y_0'$) in FIG. 3. This is conveniently accomplished after the light pen is disabled as shown in block 607 to prevent spurious indications. The status of light pen detector 181 in FIG. 2 is then interrogated as indicated by block 609 in FIG. 6. If it has been determined that a light pen strike has occurred during the drawing of the current vector, i.e., $A_0$ in FIG. 3, the light pen evaluation procedures described above commence.

If no light pen strikes have been detected, a determination is then made as to whether the indexing variable I remains equal to zero. Thus, if the original vector was drawn with no light pen strike occurring, this may indicate that the user simply did not operate the light pen. Thus when I = 0 (decision block 613) and no light pen strike is detected at step 609, a return to the calling program is effected as indicated by the circle 620. This return is designated a negative return, however, in the sense that the contents of registers 377 and 378 are not interpreted as having information regarding a particular part of the displayed image.

If no light pen strike was detected but a tracing process was underway, indexing variable I will have a value other than zero and the question posed at decision block 613 will receive a negative answer. Upon this occurrence, the value of J is interrogated (decision block 614). If J is found to have a value of zero, indicating that the vector drawn was the first of a pair of vectors, then J is set equal to 1 as indicated by block 615 and a return to node 610 is effected. At this point the second of the pair of vectors generated at a given iteration is drawn.

If upon a negative light pen strike indication at block 609 it was found further that the conditions $I \neq 0$ and $J \neq 0$ were detected, the conclusion must be that although a light pen strike evaluation was in progress and the vector currently considered was the second of a pair, nevertheless no light pen strike was detected. This might occur as mentioned above because a user moved his hand during the course of the evaluation procedure. Assuming that such "shaking" may have occurred, the evaluation procedure then provides that J will again be set equal to zero at block 630 and the current iteration is repeated. Thus X and Y are returned to the values they assumed at the beginning of the current iteration. This is indicated by block 631. The indexing variable K is then incremented by 1 at block 632. A test for the number of unsuccessful tries at a given iteration level is then made at block 633. If it is found that this number K exceeds the value KREF determined to be acceptable, then a return to the calling program is made with a negative indication as with the case at circle 620. This return is indicated by circle 635. If a return to the beginning of the current iteration was not repeated as many as KREF times, a return to node 610 is then effected.

Assuming that at decisional block 609 an affirmative response is received (either upon an original, zeroth, iteration or otherwise) the index variables J and K are set equal to zero at block 640. A test is then made at block 641 to determine whether the magnitude of the currently drawn vector is less than or equal to the reference magnitude VREF. If it is found that the currently drawn vector has a magnitude less than or equal to VREF, then a return is effected to the calling program. This return, indicated by circle 642 is, however, a positive return and the calling routine may interpret the contents of registers 377 and 378 as indicative of the position of the light pen.

If the magnitude of the currently drawn vector is greater than VREF, then the next iteration is commenced. Thus $\Delta X$ and $\Delta Y$ are each diminished by half (or, alternately, the previous $\Delta X$ or $\Delta Y$) and have their signs changed. This is indicated at block 643. Also, the iteration indexing variable I is incremented by 1 at block 644. A return to node 610 is then effected and the next iteration is actually commenced.

It is clear that the halving operation performed at the block 616 can in appropriate cases be modified to the extent that a factor of greater than (or less than) 2 can be introduced at each iteration. Such a technique may be useful when additional information exists about the location of a given vector.

Numerous and varied modifications to the above-described procedures will occur to those skilled in the arts. It is clear, for example, that one more of the steps outlined in the word statement of an algorithm in accordance with the present invention and the flow chart description of one embodiment of the present invention may be suitably modified when characteristics of particular hardware elements or software languages so dictate. In particular, it is clear that no programming step need necessarily be provided for up-dating the current value of X or Y when vector generator 381 provides such a feature. It is also clear that display terminal 142 may include a display device other than a CRT to perform the function of display device 150. Similarly, it is clear that the inputs to the intensity control unit 151 may be suitably modified to provide for such functions as blinking. This is conveniently accomplished under the control of appropriate bits in parameter words of the form shown in FIG. 4C and in the above-cited Christensen et al. patent.

It is clear that the teachings of the present invention extend to the identification of visual images having other than a straight line format. In particular, curved lines having a length parameter measured along the path of such lines starting at a fixed origin may also be processed in the manner described above. Thus, for example, if an image is drawn in terms of a coordinate system such as a polar (or other curvilinear) coordinate system, it is possible to provide for the successive halving and testing of intermediate results in the manner provided above. In such case, however, the halving is with respect to the angular coordinate.

Two and three dimensional extensions of the above-described techniques are apparent. Thus, for the example, a rectangular or other subarea within a larger rectangular or arbitrarily shaped area may be identified by tracing in the manner described along each of two coordinates while evaluating successive light pen strikes. The three dimensional version requires such halving, detecting and evaluating for each of three coordinates.

Other variations will occur to those skilled in the relevant arts in light of the teachings of the present invention.

What is claimed is:

1. A system for identifying a portion of a visual image comprising a source of first control signals corresponding to said visible image, a display device responsive to said first control signals for generating said visual image, means responsive to said displayed image for generating an output signal, control means responsive to said output signal for modifying said control signals, thereby to generate another set of control signals corresponding to a truncated version of said image, and means for repeating the above steps until said modified signals correspond to a truncated image having a magnitude less than a prescribed minimum.

2. A system in accordance with claim 1 wherein said display device comprises a cathode ray tube, and said means responsive to said image comprises a light pen.

3. Apparatus in accordance with claim 1 wherein said means responsive to said control signals comprises a vector generator, and said continuous image comprises a straight line segment.

4. Apparatus according to claim 3 wherein said control means comprises a stored program computer.

5. Apparatus according to claim 4 further comprising a plurality of storage registers and wherein said stored programmed computer comprises a memory for storing a plurality of data and program signals, and means for loading said registers with data signals in response to data signals retrieved from said memory.

6. The machine method for identifying a portion of an image appearing on a display device comprising the steps of generating on a display device an image containing the portion to be identified, detecting the generation of this image, machine generating successive pairs of subimages, each pair covering a portion of the subimage generated at the previous generation, machine comparing a space parameter of each of said subimages with a reference parameter, and terminating the generation of subimages when the occurrence of a particular subimage is detected and when the space parameter corresponding to the detected subimage corresponds in a predetermined manner to said reference parameter.

7. The method of claim 6 wherein each of said subimages upon a given iteration are equal in extent and together are equal to one of the subimages generated upon the immediately preceding iteration.

8. The method of claim 7 comprising the further step of repeating the entire sequence of generating decreasingly less comprehensive subimages whenever a subimage has a special parameter bearing a fixed relationship to said reference parameter and no subimage has been detected.

9. The method in accordance with claim 6 wherein a pair of subimages formed upon a given iteration are, when taken together, coextensive with a subimage formed and detected at the immediately preceding iteration.

* * * * *

UNITED STATES PATENT OFFICE
CERTIFICATE OF CORRECTION

Patent No. 3,651,508 Dated March 21, 1972

Inventor(s) Paul E. Scarborough, Jr., and David S. Watson

It is certified that error appears in the above-identified patent and that said Letters Patent are hereby corrected as shown below:

Column 2, line 7, change "or" to --of--. Column 6, line 6, change "display" to --displayed--; and line 45, change "stage" to --state--. Column 7, lines 69 thru 75 and column 8, lines 1 thru 3, section (i) is tabulated incorrectly and should read as follows:

--(i) Prepare two vectors ($\Delta X_1$, $\Delta Y_1$) and ($\Delta X_2$, $\Delta Y_2$) such that $$\Delta X_1 = [ -\Delta X_0/2 ]$$

$$\Delta Y_1 = [ -\Delta Y_0/2 ]$$

$$\Delta X_2 = \Delta X_1 \text{ if } \Delta X_0 \text{ is an even integer}$$

$$= \Delta X_1+1 \text{ if } \Delta X_0 \text{ is odd and negative}$$

$$= \Delta X_1-1 \text{ if } \Delta X_0 \text{ is odd and positive}$$

$$\Delta Y_2 = \Delta Y_1 \text{ if } \Delta Y_0 \text{ is an even integer}$$

$$= \Delta Y_1 + 1 \text{ if } \Delta Y_0 \text{ is odd and negative}$$

$$= \Delta Y_1 - 1 \text{ if } \Delta Y_0 \text{ is odd and positive}$$

where ($\Delta X_0$, $\Delta Y_0$) is the original vector giving rise to a light pen strike whose position is to be evaluated.--.

Column 10, line 32, delete "the".

Signed and sealed this 8th day of August 1972.

(SEAL)
Attest:

EDWARD M.FLETCHER,JR.
Attesting Officer

ROBERT GOTTSCHALK
Commissioner of Patents

UNITED STATES PATENT OFFICE
CERTIFICATE OF CORRECTION

Patent No. 3,651,508 Dated March 21, 1972

Inventor(s) Paul E. Scarborough, Jr.; and David S. Watson

It is certified that error appears in the above-identified patent and that said Letters Patent are hereby corrected as shown below:

Change inventor's name from "Paul Edward Scarborough, Jr." to --Paul Eugene Scarborough, Jr.--.

Signed and sealed this 5th day of December 1972.

(SEAL)
Attest:

EDWARD M.FLETCHER,JR.
Attesting Officer

ROBERT GOTTSCHALK
Commissioner of Patents